United States Patent
Yu et al.

(10) Patent No.: US 9,121,722 B1
(45) Date of Patent: Sep. 1, 2015

(54) TRIP PARTITIONING BASED ON DRIVING PATTERN ENERGY CONSUMPTION

(71) Applicant: FORD GLOBAL TECHNOLOGIES, LLC, Dearborn, MI (US)

(72) Inventors: Hai Yu, Canton, MI (US); Fling Tseng, Ann Arbor, MI (US); Qing Wang, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/219,293

(22) Filed: Mar. 19, 2014

(51) Int. Cl.
| | |
|---|---|
| *B60L 9/00* | (2006.01) |
| *B60W 10/00* | (2006.01) |
| *G01C 21/34* | (2006.01) |
| *B60L 15/20* | (2006.01) |

(52) U.S. Cl.
CPC ......... *G01C 21/3469* (2013.01); *B60L 15/2045* (2013.01); *G01C 21/343* (2013.01); *G01C 21/3492* (2013.01)

(58) Field of Classification Search
USPC ....................................... 701/22; 180/65.265
See application file for complete search history.

(56) References Cited

U.S. PATENT DOCUMENTS

| | | | | |
|---|---|---|---|---|
| 5,487,002 | A * | 1/1996 | Diller et al. ...................... 701/1 |
| 7,360,615 | B2 * | 4/2008 | Salman et al. ........... 180/65.265 |
| 8,086,364 | B2 | 12/2011 | Xue et al. |
| 8,190,318 | B2 * | 5/2012 | Li et al. ........................... 701/22 |
| 2007/0010933 | A1 * | 1/2007 | Hochkirchen et al. ......... 701/117 |
| 2009/0229900 | A1 * | 9/2009 | Hafner et al. ............ 180/65.275 |
| 2009/0259354 | A1 * | 10/2009 | Krupadanam et al. .......... 701/22 |
| 2010/0179714 | A1 * | 7/2010 | Tani et al. ........................ 701/22 |
| 2011/0006941 | A1 * | 1/2011 | Samukawa et al. ............. 342/70 |
| 2011/0202221 | A1 * | 8/2011 | Sobue et al. .................... 701/22 |
| 2013/0103238 | A1 * | 4/2013 | Yu et al. .......................... 701/22 |

* cited by examiner

*Primary Examiner* — Thomas G Black
*Assistant Examiner* — Tyler Paige
(74) *Attorney, Agent, or Firm* — David B. Kelley; Brooks Kushman P.C.

(57) ABSTRACT

A vehicle includes an electric machine configured to propel the vehicle using battery power. The vehicle also includes a controller programmed to operate the electric machine along a predetermined route based on a superposition of a plurality of partitionings of the route. Each of the partitionings is based on a different force characteristic associated with the route and defines at least one segment transition, where each segment transitions defines an end of a previous segment and a beginning of a subsequent segment. The predetermined route segments are such that no two adjacent segments of the superposition are defined by a same force characteristic.

16 Claims, 7 Drawing Sheets

TRIP PARTITIONING BASED ON DRIVING PATTERN ENERGY CONSUMPTION

TECHNICAL FIELD

The present disclosure relates to vehicle powertrain control systems.

BACKGROUND

Environmental and energy security concerns have caused increasingly higher requirements on energy sustainability and efficiency. Vehicle electrification is a technology that can contribute to addressing environmental and energy issues. Electric vehicles (EV) enabled by the power grid offer an efficient energy source as compared to vehicles propelled solely by internal combustion. However, technical challenges like EV range and ownership costs should be overcome to facilitate large scale market acceptance.

Range anxiety has been a limiting factor for EV applications. The range of EV largely depends on battery capacity. A full recharge of the EV battery often takes several hours using a standard power outlet. In comparison, it takes only several minutes to refill a gas tank. Potential trip abortion, or interruption, caused by battery depletion are primary concerns of EV customers. Success of EV applications may rely on the establishment of fast battery charging and replacing facilities. Also, information technology may provide EV customers with more accurate range estimation, energy efficient routing, and recharge guidance.

SUMMARY

In at least one embodiment, a vehicle includes an electric machine configured to propel the vehicle using battery power. The vehicle also includes a controller programmed to operate the electric machine along a predetermined route based on a superposition of a plurality of partitionings of the route. Each of the partitionings is based on a different force characteristic associated with the route and defines at least one segment transition, where each segment transitions defines an end of a previous segment and a beginning of a subsequent segment. The predetermined route segments are such that no two adjacent segments of the superposition are defined by a same force characteristic.

In at least one embodiment, a method of operating a vehicle includes partitioning a predetermined route based on a first route characteristic into a first series of segments each defined by a first segment transition, and partitioning the predetermined route based on a second route characteristic into a second series of segments each defined by a second segment transition. The method also includes superposing the first and second series of segments to define the route such that no two adjacent route segments are defined by a same route characteristic. The method further includes operating an electric machine along the predetermined route based on route characteristics associated with the superposed segments.

In at least one embodiment, a vehicle powertrain includes an electric machine powered by a battery. The vehicle further includes a controller programmed to partition a predetermined route based on a first force characteristic, and additionally partition the predetermined route based on a second force characteristic. The controller is further programmed to superpose the route partitions to define segments such that no two adjacent segments are defined by a same force characteristic, and demand power output from the electric machine according to an overall route force pattern defined by the segments.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
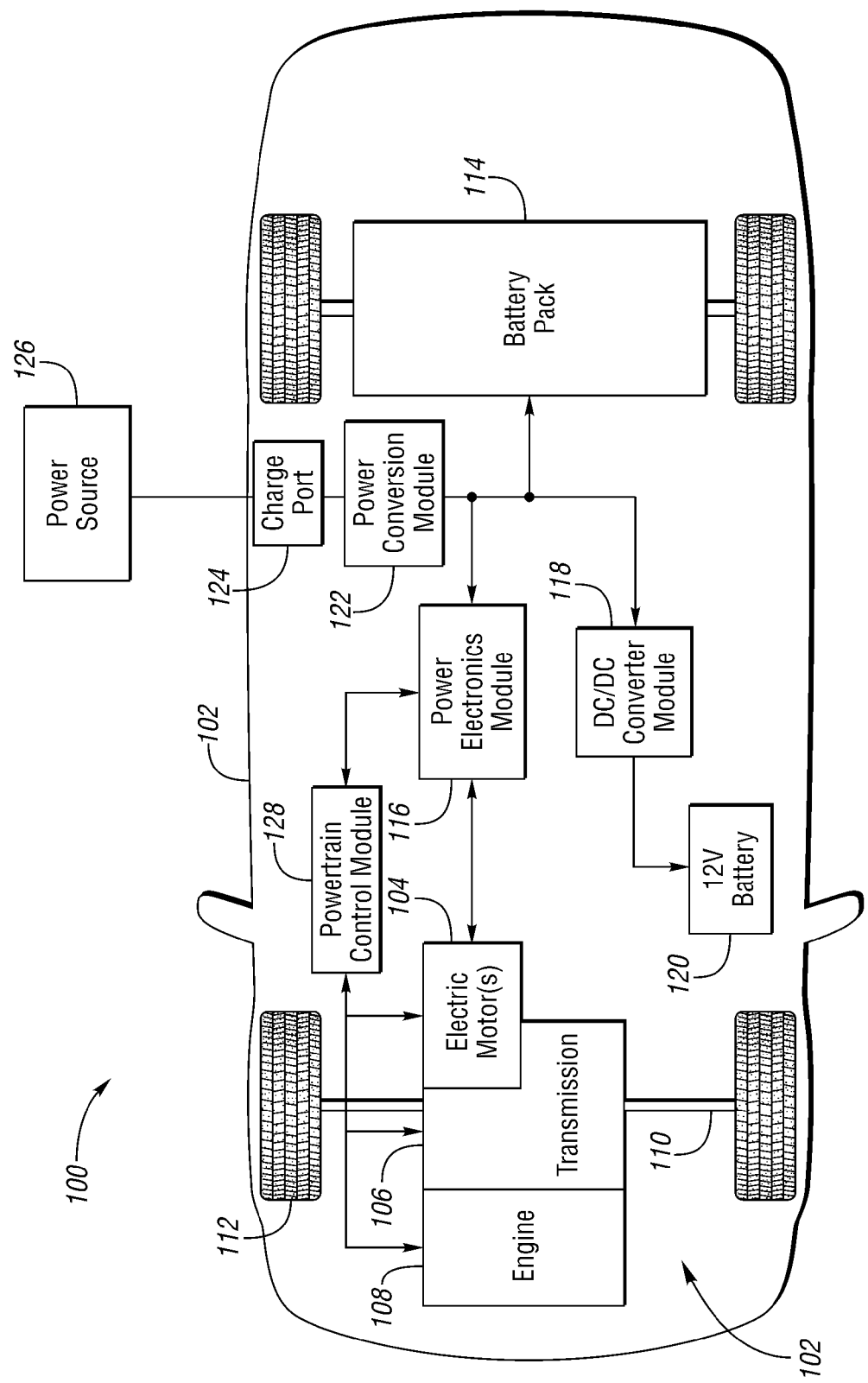
FIG. 1 is a schematic view of a hybrid-electric vehicle.

FIG. 1 depicts an example of a plug in hybrid-electric vehicle 100. A hybrid-electric powertrain 102 may comprise one or more electric machines, or electric motors 104 mechanically connected to a hybrid transmission 106. In addition, the hybrid transmission 106 is mechanically connected to an engine 108. The hybrid transmission 106 may also be mechanically connected to a drive shaft 110 that drives wheels 112. The electric motor(s) 104 can provide vehicle propulsion when the engine 108 is turned on, as well as when the engine is turned off. The electric motor(s) 104 can additionally provide vehicle deceleration by imparting a resistive torque upon the drive shaft. The electric motor(s) 104 may also be configured as electric generators and provide fuel economy benefits by recovering energy that would normally be lost as heat in the friction braking system. The electric motor(s) 104 may also reduce pollutant emissions since the hybrid electric vehicle 102 may be operated in an electric machine powertrain mode under certain conditions.

The traction battery, or battery pack 114, stores energy that can be used to power the electric motor(s) 104. A vehicle battery pack 114 is capable of providing a high voltage DC output. The battery pack 114 is electrically connected to a power electronics module 116. The power electronics module 116 is electrically connected to the electric motor(s) 104, and provides the ability to bi-directionally transfer energy between the battery pack 114 and the electric motor(s) 104. For example, the battery pack 114 may provide a DC voltage while the electric motor(s) 104 may require a three-phase AC current to function. In this case, the power electronics module 116 converts the DC voltage to a three-phase AC current to be received by the electric motor(s) 104. In a regenerative mode, the power electronics module 116 will convert the three-phase AC current from the electric motor(s) 104 acting as generators to the DC voltage required by the battery pack 114. The methods described herein are equally applicable to a pure electric vehicle or any other device using a battery pack.

In addition to providing battery power for propulsion, the battery pack 114 may provide energy for other vehicle electrical systems. A DC/DC converter module 118 is capable of converting the high voltage DC output of the battery pack 114 to a low voltage DC supply that is compatible with low voltage vehicle loads. Other high voltage loads, such as compressors and electric heaters, may be connected directly to the high-voltage bus from the battery pack 114. The low voltage systems may also be electrically connected to a 12V battery 120. An all-electric vehicle may have a similar architecture but without the engine 108.

The battery pack 114 may be recharged by an external power source 126. The external power source 126 may provide AC or DC power to the vehicle 102 by electrically connecting through a charge port 124. The charge port 124 may be any type of port configured to transfer power from the external power source 126 to the vehicle 102. The charge port 124 may be electrically connected to a power conversion module 122. The power conversion module may condition the power from the external power source 126 to provide the proper voltage and current levels to the battery pack 114. In some applications, the external power source 126 may be configured to provide the proper voltage and current levels to the battery pack 114 such that the power conversion module 122 may not be necessary. For example, the functions of the power conversion module 122 may be contained in the external power source 126. The vehicle powertrain including engine, transmission, electric motors, electric generators and power electronics may be controlled by a powertrain control module (PCM) 128.

In addition to illustrating a plug-in hybrid vehicle, FIG. 1 can be representative of a battery electric vehicle (BEV) if the engine 108 is removed. Likewise, FIG. 1 can represent a traditional hybrid electric vehicle (HEV) or a power-split hybrid electric vehicle if the components 122, 124, and 126 that are related to plug in charging are removed.

The present disclosure provides a method of accurately estimating changes in energy consumption rate associated with changes in transportation conditions. The energy consumed to satisfy demand for vehicle propulsion is largely determined by vehicle states such as speed and inertial acceleration. Variations of the vehicle speed and acceleration are generally associated with driving behavior. Reality dictates that driving behavior is constrained by traffic and road conditions. However driving behaviors do tend to exhibit a certain degree of similarity across the same road sections, but may differ from section to section along a given trip. As a result, methods capable of modeling various driving behavior patterns generically can assist in trip-oriented energy consumption analysis and planning.

Previewing vehicle speed information can be used for constructing driving patterns. Acceleration may be implicitly modeled from the vehicle speed combined with other factors that either deterministically or statistically shape acceleration expected profiles. The additional factors may also be used for construction of separate patterns. The aggregate of all relevant factors largely shapes how a vehicle behaves on road. A predetermined trip can be partitioned in advance based on attributes of these factors such transitions are recognized between adjacent partitions. Each partitioned road section is distinguished by a characteristic feature combination that will result in distinctive drive energy demand property when experienced on road. Data clustering methods are used to identify different zones along the route. The driving patterns of the overall route are realized by synthesizing all of the separately partitioned zones along the route. Driving scenarios can be differentiated by objective measures based on high impact factors such as road curvature, elevation variation, speed regulation, etc. Generically modeled driving patterns are used as initial candidate patterns to construct a more application-oriented driving pattern once the host and specific trip information available.

During driving, a majority of on-road vehicle energy consumption comes from the energy required to propel the vehicle. Other energy consumption sources include vehicle accessories and supporting systems. The total electrical energy available for vehicle propulsion over a predetermined route, $E_{drv}$ may be characterized in a time domain as:

$$E_{drv} = E_{batt} - \int_0^{T_S} P_{acc} dt \quad (1)$$

where $E_{batt}$ is the total electrical energy available from the battery and $T_S$ is the time duration of vehicle operation during the route. $P_{acc}$ is power provided to vehicle accessories, plus other operational losses of the vehicle. $P_{acc}$ may be integrated over the time duration $T_S$ to represent the total energy discharged from the battery.

The total energy available for vehicle propulsion $E_{drv}$ may also be characterized in a spatial domain over the distance of the entire route.

$$E_{drv} = \int_0^S F_{drv} ds = \int_0^S F_{whl} ds + \int_0^S F_{acc} ds \quad (2)$$

where S is the total trip distance and s is the spatial domain distance variable. $F_{drv}$ is the equivalent resistive drive force needed for vehicle propulsion. This is the total force reflected at the wheels to maintain or to change an operating state of the vehicle. $F_{drv}$ may also be integrated over the trip distance to obtain the energy associated with the total work performed to propel the vehicle along the route. $F_{whl}$ is the actual wheel traction force, and $F_{acc}$ is a dummy wheel force term representing the vehicle accessary loads plus operational energy losses. Each of the component forces may also be integrated over the length of the route to obtain the respective contributions to overall energy consumption.

To further decompose these factors, the driving patterns of the present disclosure are indirectly constructed from several contributive impact factors of $F_{drv}$. Decomposing $F_{drv}$ into smaller components allows for a more complete analysis of driving patterns. The total force may be represented as:

$$F_{drv} = F_{ine} + F_{fbk} F_{drag} + F_{rgl} + F_{acc} \quad (3)$$

where $F_{ine} = m\dot{V}_x$ is the inertial resistive force based on vehicle speed and vehicle mass. $V_x$ is vehicle speed, and $\dot{V}_x$ is the rate of change of vehicle speed, or acceleration. m is the total vehicle mass. $F_{fbk}$ is the frictional brake resistive force at the wheels.

$F_{drag}$ is a lumped drag force including aerodynamic and rolling resistances that can be approximated by:

$$F_{drag} = k_0 + k_1 V_x + k_2 V_x^2 + k_3 \delta \quad (4)$$

where $\delta$ is the road wheel steering angle. The parameter $k_i$, i=0, 1, 2, 3 are constants associated with vehicle and environmental conditions. $F_{rgl}$ is a road gradient load resistive force that may approximated by:

$$F_{rgl} = mg^* \sin \alpha_r \quad (5)$$

where $\alpha_r$ is the road pitch angle.

Based on the above decomposition of $F_{drv}$, a representative model of the contributive force components and impact factors may be derived for advance planning before direct measurements are available. From the drive force decomposition, particularly high impact factors like $V_x$, $\dot{V}_x$, $\delta$ and $\alpha_r$ are identified, as they contribute to several of the resistive forces. Certain individual factors may be grouped by a particular related feature. For example, the feature combination of $V_x$ and $\dot{V}_x$ may be referred to as a "speed factor." Also, both $\delta$ and $\alpha_r$ are derived from features related to road geometry data and may be referred to a "curve factor" and a "hill factor," respectively.

Drive patterns may be distinguished based on the above identified feature factors. Each of the feature factors frequently exhibit different properties when view in a different time domains. Using particular time scales for data analysis of various factors may facilitate the pattern processing and accuracy. To this end, at least three time scales are utilized in aspects of this disclosure: static, quasi-static, and dynamic time scales.

The static time scale may indicate feature behavior or patterns that are stable over a relatively long period of time. The feature factors best analyzed in the static time scale are considered "static factors." For example, they may include road geometry data such as road pitch angle, road curvature, regulation-based stop frequency, speed limits, terrain types, etc. Each of these factors typically remains stable over long durations. Driving patterns identified from static factors are generic in that they can typically be applied to different applications, different vehicles, and driver configurations.

The quasi-static time scale is much like the static time scale. However, factors that may be subject to very infrequent change are analyzed in the quasi-static time scale. Such features are still relatively stable over a certain period of time, and can be considered "quasi-static factors." For example, a speed limit change due to road construction, or a regulatory speed change due to traffic accident are feature factor variations that may be suitable for analysis in the quasi-static time domain. Feature factor variation in the quasi-static time scale can be used to update the static feature factors based on pattern recognition results that may have become out of date, or obsolete. Since the quasi-static feature information will be valid and stable for a period of time and for a certain section of road, the updated pattern recognition can also be applied generically to different applications, different vehicles, and driver configurations.

The dynamic time scale captures route characteristics that frequently or even continuously change over time. Commonly this information is only valid for very short periods of time and therefore the effective horizon for upcoming road section is limited. Dynamic feature information is also often host-specific, and may be limited to use for only certain applications. For example, traffic information can be conducive for analysis in the dynamic time scale and may be subject to up-to-the-minute updating. In a spatial domain, traffic flow information is often reliable only for hundreds of meters to several miles ahead of the subject vehicle. Also weather conditions may also be considered as a dynamic feature factor. Additionally, certain impact factors may be further decomposed to include static and dynamic components.

By carrying out the time scale decomposition for the pertinent feature factors, it enables pattern synthesis and identification to be processed separately in different time scales. As discussed above, a large amount of feature factors that are highly impactful to a driving process are actually static. Thus, driving patterns can be identified over these factors offline relative to the vehicle to construct a map based spatial domain pattern database. For example, off-vehicle cloud computing based control and information sharing are possible, particularly for the static factors. Offline preprocessing of the route data largely minimizes the processing computation and communication resources required at the vehicle for real time applications. Additionally, the processed static data is generic such that the processing results can be shared for all vehicles driving on and approaching a common section of road. Once the particular host vehicle information and the dynamic trip information are available, advanced driving pattern updating needs only to be processed with respect to the information for base driving patterns that has changed from the static pattern database over the trip sections applied.

Impact feature factors also vary in the spatial domain. They exhibit different modes of variations through different sections of road. For example, the road pitch angle $\alpha_r$ exhibits large variation and magnitude in a hilly region but it is much more stable along a section of freeway. Thus, trip sections through hilly regions are separated from those along interstate highways since the energy demand contributed by the road gradient load resistive force $F_{rgl}$ will be significantly different across each of these different regions. A second example is that the speed profile in an urban area contains much more iteration of stop and go cycles as compared to an interstate highway. As a result, it may be beneficial to carry out the driving pattern analysis together with the trip partitioning such that the pattern features in each partitioned road section has distinguishable energy demand properties. Through feature-based trip partitioning, the behavior of a single feature within a trip section can be consistent and monotonous. The energy demand over each section can be more accurately evaluated since the stronger the differentiation among patterns, the more precise the energy demand property can be established through Dynamic Programming energy consumption analysis or from vehicle test data.

Figure 2:
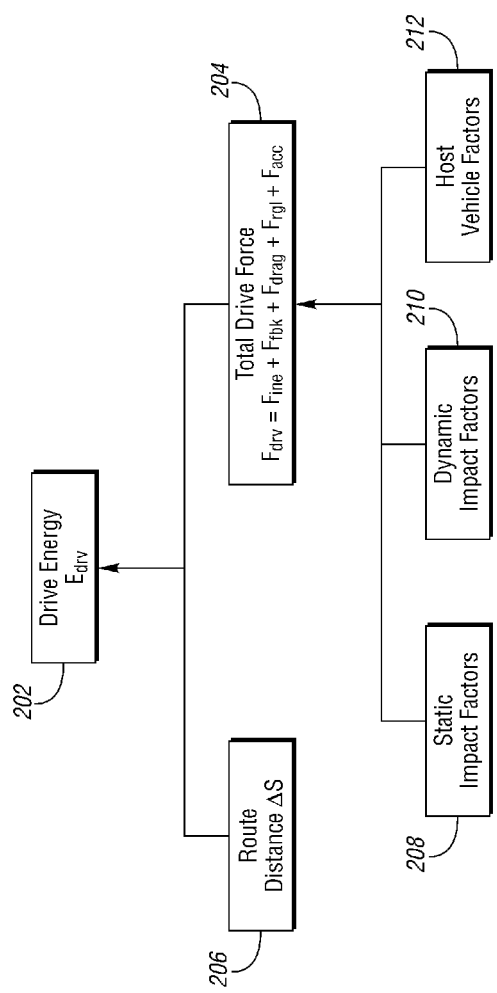
FIG. 2 is a block diagram for drive energy.

Referring to FIG. 2, impact factor analysis is shown schematically by a system block diagram illustrating high-level information flow. Drive energy 202 is derived from the total drive force 204 applied at the wheels, applied over the total route distance 206. As described above, the total drive force 204 comprises several component forces caused by a number of different sources. Also described above, static impact factors 208 and dynamic impact factors 210 influence the total drive force 204 required at the vehicle wheels. Certain attributes of the subject vehicle, or host factors 212, further contribute to the force components that contribute to the total drive force 204.

Figure 3:
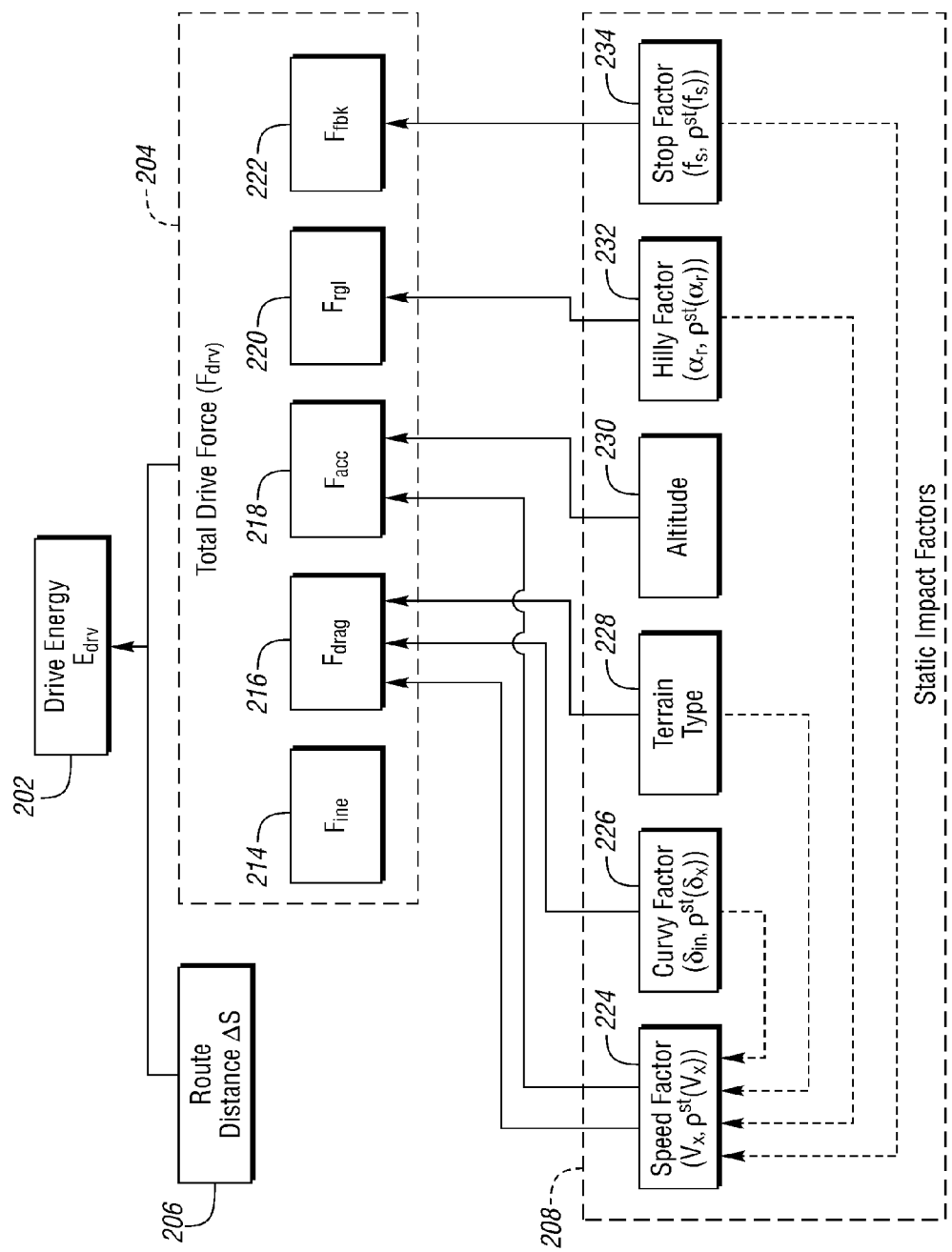
FIG. 3 is a block diagram for static factor input to drive energy.

FIG. 3 is also a block diagram, but depicts the static impact factors and total drive force components in greater detail. In the example, total drive force 204 at the wheels is represented by five component forces. Vehicle inertia force 214, drag force 216 (including aerodynamic and rolling resistance), equivalent dummy wheel force 218 representing power to vehicle accessories, road gradient load force 220, and frictional brake force 222 each contribute to the modeled total drive force 204 required at the wheels. It is contemplated that additional resistive force characteristics may be used to comprise the total drive force.

Similarly, the static impact factors 208 include several resistive force factors that influence the required force at the wheels. In the example of FIG. 3, a speed factor 224, a curve factor 226, terrain type 228, altitude 230, hill factor 232, and stop factor 234 each are static factors that contribute to the force required to propel the vehicle. As discussed above, each of the static impact factors is generally stable and may be treated as generic so as to apply to different vehicles.

The speed factor 224 is largely based on vehicle speed V, and serves as an input into the drag force 216 as well as wheel force 218 representing power to vehicle accessories. For example, known speed limits along the route may serve to influence the speed factor 224. Speed profile information may be available from vehicle driving history, or from transportation databases. Also, information about route speed limits may be available from navigation or map data.

The curve factor 226 is a resistive force factor largely based on road curvature as indicated by the road wheel steering angle θ, and contributes to the overall drag force 216. Geometric map data regarding road shapes may be used to derive static road curvature information along a route.

The terrain factor 228 according to terrain type also influences overall drag 216. For example the road terrain type may account for paved versus unpaved road surfaces, which can directly contribute to rolling resistance. The altitude 230 may contribute to the equivalent dummy wheel force 218 representing power required to operate vehicle accessories.

The hill factor 232 is a resistive force factor largely based on the road pitch angle $α_r$, and directly contributes to the road gradient load force 220. Road elevation data is available along a trip from map data or from host vehicle driving records. The road pitch angle can be derived from the geometric elevation data of roads.

The stopping characteristics of the route, or the stop factor 234, contributes to the frictional brake force 222 required at the wheels. The stop factor is a resistive force factor largely based on the frequency and duration of known stop locations along the route. Raw data for the stop factor includes the potential of a stop in terms of percentage at known locations along the route. Traffic lights, intersections, stop and yield signs all present varying likelihoods of vehicle stoppage. The stop intensity may be available from traffic data or from previous driving patterns.

By further reference to FIG. 3, there is also interaction between the static factors whereby several factors influence other factors. For example, the curve factor 226 which accounts for road curvature, may also operate to influence the speed factor 224 and subsequent speed traveled along the route. Similarly, the terrain type 228 may allow for greater or lesser speed along certain portion of the route. In this way the terrain type 228 also influences the speed factor 224. Also, the stop factor 234 which accounts for frequency and duration of stop events influences the speed factor 224.

Figure 4:
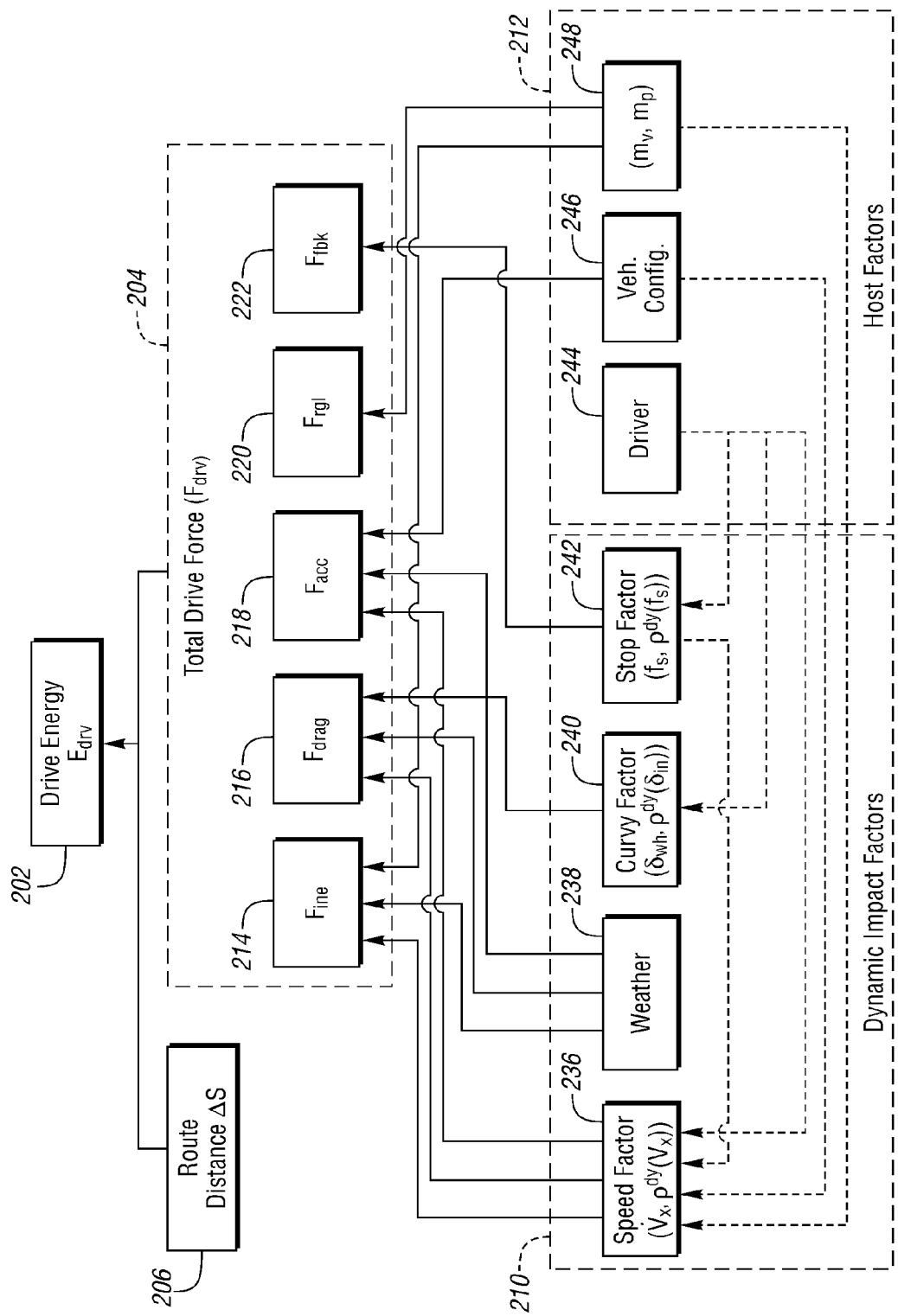
FIG. 4 is a block diagram for dynamic factor input to drive energy.

FIG. 4 depicts a similar relationship of information transfer by way of a block diagram. The influence of both of the dynamic impact factors 210 and host vehicle factors 212 upon the total drive force 204 is shown in the diagram. The total drive force 204 is the same as that shown in FIG. 3, and includes several sources that influence the required force at the wheels. In the example of FIG. 4, the dynamic impact factors 210 include a dynamic speed factor 236, a weather factor 238, a curve factor 240, and a stop factor 242. In at least one embodiment, the controller monitors each of the dynamic impact factors, updates at least one of the partitions based on changes in a dynamic resistive force factor.

A dynamic speed factor 236 is influenced by the change in vehicle speed $\dot{V}_x$ and affects the vehicle inertia force 214, drag force 216, and the equivalent dummy wheel force 218 representing power required to operate vehicle accessories. The dynamic speed factor 236 can be derived from vehicle acceleration and deceleration along the route that deviates from the static force pattern. Also, live traffic conditions may be transmitted to the controller to update the dynamic speed factor 236.

The weather factor 238 is another dynamic impact factor that affects the vehicle inertia force 214, drag force 216, and the equivalent dummy wheel force 218 representing power required to operate vehicle accessories. The weather factor 238 may include, for example, high winds, snow, ice, rain, temperature, or other conditions which may affect speed, drag, or accessory load.

The dynamic curve factor 240 includes the road wheel steering angle δ. Compared to the static curve factor 226, the dynamic curve factor 240 additionally accounts for driver dynamic steering and curvature that deviates from the known static road curvature.

The stop factor 242 is based on changes in stop intensity that deviate from the predetermined static stop factor 234. For example, in response to more or less frequent stops compared to the static stop pattern, the controller may update the energy consumption forecast.

There are also several host factors 212 that are particular to the subject vehicle. The driver factor 244 may include a profile assigned to a particular driver, including preferences and driving habits of the driver. The driver factor 244 may therefore have an influence on other dynamic impact factors. For example, each of the speed factor 236, the curve factor 240, and the stop factor 242 are influenced by the driver factor 244.

The vehicle configuration 246 is an additional host factor particular to the vehicle. For example the vehicle may offer sport modes, comfort modes, or economy modes that change the force applied and the wheels influence the speed factor 236. Additional forces may be attributed to the equivalent accessory force 218 representing accessary energy consumption and operational energy losses. Also relevant to the vehicle configuration 246 is whether the vehicle is engaged in four-wheel drive or two-wheel drive. The number of wheels propelling the vehicle may further influence the force applied at the vehicle wheels.

The mass factor 248 represents the mass of the vehicle, as well as the driver. These masses operate as input to the inertial resistive force 214 and the road load gradient force 220. There are further interactions between the mass factor 248 and the dynamic speed factor 236.

Figure 5:
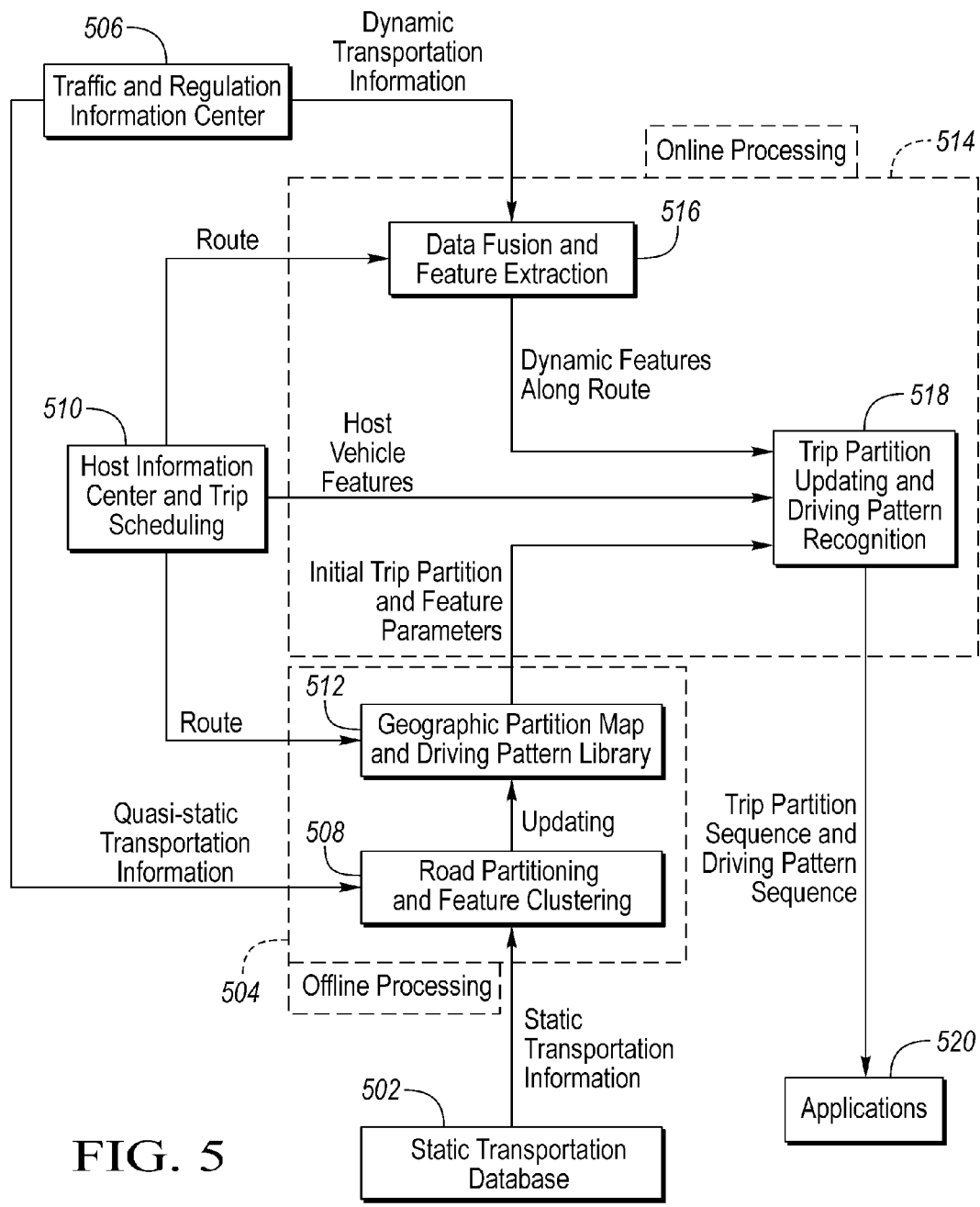
FIG. 5 is a system diagram of a powertrain management system.

FIG. 5 is a system diagram depicting the relationship between various data sources and data recipients of a driving pattern recognition system according to an embodiment. As discussed above, static impact factors may be calculated and processed offline. A static transportation database 502 can provide certain data concerning roads. These data may include at least information regarding road curvature, elevation, speed limits, and surface terrain type. The general static transportation information may be transmitted to an offline processor 504 from the transportation database 502.

Certain static information concerning roads may be considered quasi-static in the sense that changes may occur from time to time. A traffic and regulation information center 506 may transmit quasi-static transportation information updates to the offline processor 504. The quasi-static information may include for example, speed limit changes or road closures related to construction. Also, regulatory speed limit changes due to a traffic accident that are stable, but deviate from the static speed factor may be considered quasi-static.

The offline processor 504 includes a first subroutine 508 that utilizes the static and quasi-static road information to partition road segments based on based on different force characteristics associated with the route. The vehicle information center 510 transmits user-selected route data to the offline processor 504. The offline processor 504 further includes a second subroutine 512 that uses information about the user-selected route and the road partitions to generate an initial trip partition specific to the user-selected route. The initial trip partition based on static and quasi-static road information is in turn transmitted to an online vehicle processor 514.

The online processor 514 includes a first subroutine 516 to process dynamic feature information. The traffic and regulation information center 506 transmits dynamic transportation information concerning the roads to the online processor 514.

The dynamic information may change often and include information such as traffic flow, accident locations, and weather conditions. In the example of FIG. 5, updated route information may be periodically provided to the vehicle from an external source.

The vehicle information center 510 also transmits the user-selected route data to the online processor 514. The first subroutine 516 may apply the dynamic transportation information from the traffic and regulation information center 506 to the user-selected route to determine dynamic features that are particular to the user-selected route.

The online processor 514 also receives information regarding host vehicle features from the vehicle information center 510. The host vehicle feature information is specific to the subject vehicle and includes at least overall powertrain efficiency and loss factors, vehicle mass, and driver and passenger mass. The host vehicle information may also include information regarding driving patterns from previous trips along common route segments.

The online processor 514 further includes a second subroutine 518 that considers the dynamic route information, the host vehicle information, and the static trip partition information to update the user-selected route. The second subroutine may update the trip partitions for example by subdividing a particular route partition based on dynamic road information, or previous host vehicle driving patterns. Alternatively, the second subroutine may combine sequential route partitions if the dynamic information affects the route such that adjacent route partitions have similar features.

A vehicle application 520 may use the refined route information to plan energy usage over the route. Discuss the vehicle applications 520 that may rely on the trip partitioned routes to plan for energy consumption over the route.

FIGS. 6A through 6E are a series of spatial plots that show a progression of the route partitioning for a generic feature factor. It is envisioned that the general progression described in reference to the series of plots may be independently applied to a number of different features. The controller may be programmed to separately partition the predetermined route for each of the different force characteristics.

Figure 6:
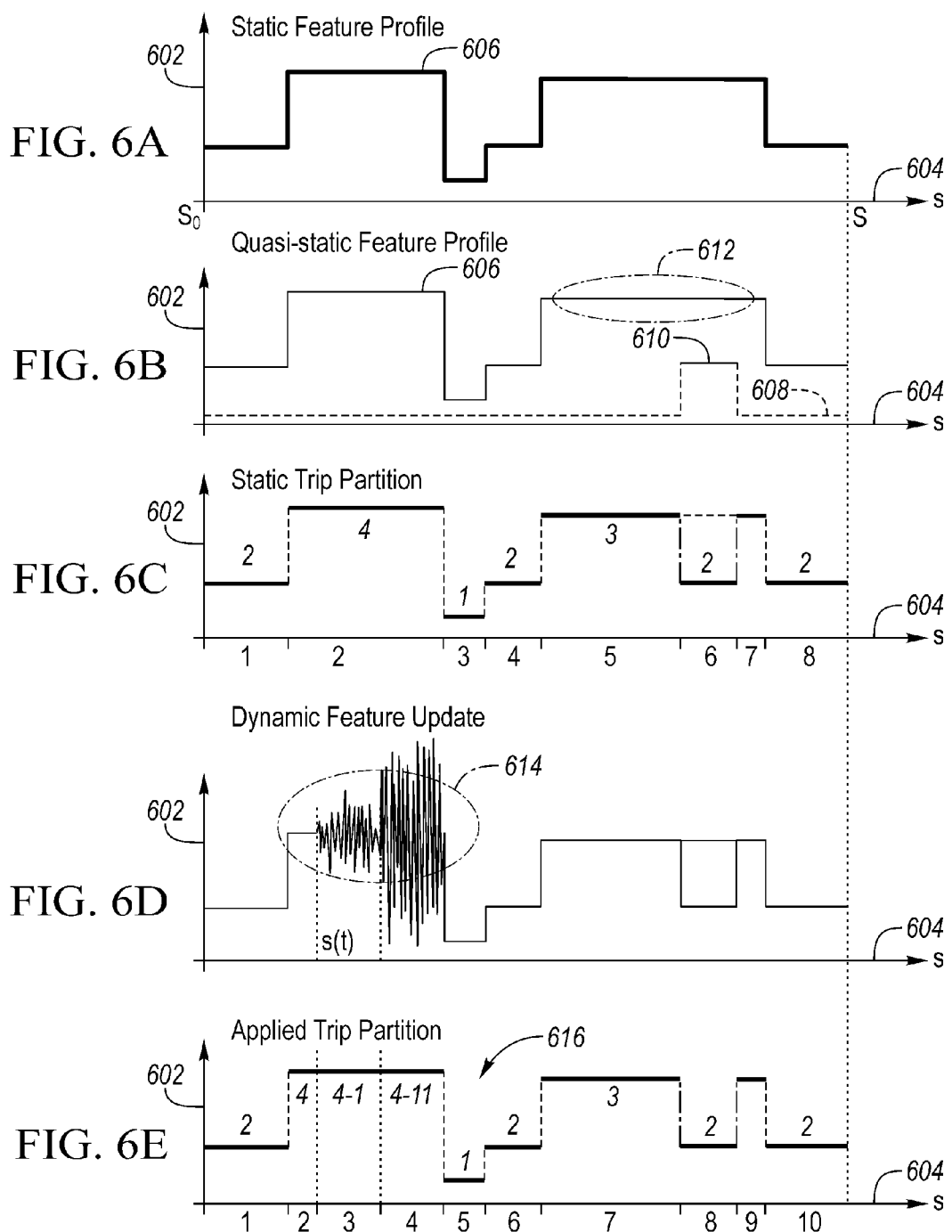
FIGS. 6A through 6E are corresponding spatial plots showing a progression of pattern recognition.

FIG. 6A depicts the static feature profile along the route. As discussed above, static profiles of various impact factors may be determined offline and distributed to different vehicles for generic usage in route planning. The vertical axis 602 corresponds to a magnitude of the static feature. The horizontal axis 604 corresponds to the location along the route between the origin and destination. In the example of FIG. 6A, a step profile 606 is illustrated that includes instant transitions in magnitude between each of the initial partitions of the route. It should be appreciated that different profiles may exist depending on the route characteristics and the static feature being considered.

FIG. 6B depicts a quasi-static updating of the static feature profile. In the example, the quasi-static update profile 608 reflects a change from the previous values along the route. The quasi-static update profile 608 is general zero along the route, where portion 610 reflects an increased magnitude of change of the base static feature profile values. Region 612 of the static feature step profile 606 is affected by the updated route information.

FIG. 6C is an initial route partitioning based on the static feature after consideration of any update. Based on differences in magnitude of the generic feature, the route is partitioned. Each partition corresponds to a predetermined magnitude level (or range). In the example of FIG. 6C, eight partitions are established using four different magnitude levels. It should be noted that partition 6 is the particular portion affected by quasi-static updating.

FIG. 6D shows dynamic updating of one partition of the route based on a dynamic feature profile. Clustering methods may be used to further subdivide the partition based on distinguishing the feature behavior during the partitioning. Region 614 is updated in the example based on the dynamic variation of the generic feature during the corresponding partition.

FIG. 6E depicts a final series of partitions after the several refinements discussed above. As can be seen from the plot, what was previously the second partition of FIG. 6B is separated into three sub-partitions based on the dynamic behavior of the generic feature. In the final partitioning 616, there are ten partitions along the route.

Based on the combination of the time scale decomposition with spatial domain partitioning discussed above, an overall driving resistive force pattern may be generated by systematically organizing the results from all of the individual feature identifications. The output of the progression of partitioning applied to a single feature as shown in FIGS. 6A through 6E is similarly applied to all of the relevant features. Each series of partitions is superposed over one another to determine an overall trip segmentation.

Figure 7:
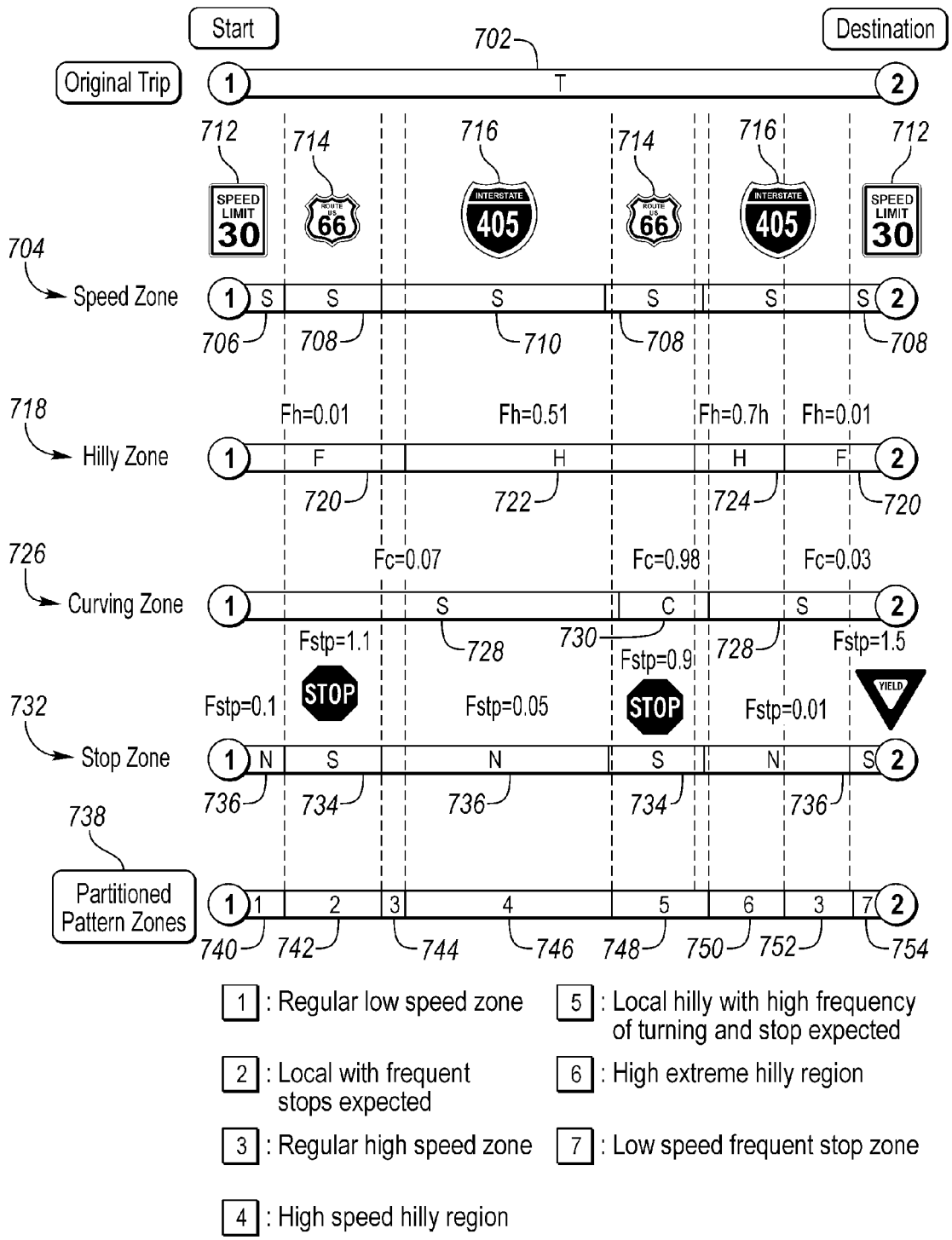
FIG. 7 is a superposition of route partitions based on different characteristics.

FIG. 7 shows an example superposition of multiple partitionings of the route based on different force characteristics associated with the route. Route 702 shows the overall trip between the start and the destination. Several different series are partitioned based on different force characteristics associated with the route.

The speed-based partitioning 704 shows various speed zones along the route. In the example of FIG. 7, there are three different levels of speed considered. Low speed zones 706, medium speed zones 708, and high speed zones 710 are generally used to characterize the different speed limits that will be experienced over the route. For example, residential speed limits 712, local highway speed limits 714, and interstate highway speed limits 716 may be represented by each of the three speed zones.

A hill-based partitioning 718 shows various zones separated based on the degree of flatness of each partition along the route. Flat zones 720, moderately hilly zones 722, and extremely hilly zones 724 may each correspond to respective ranges of road pitch angle along the route. In the example of FIG. 7, a hill factor may be used to distinguish each of the partitions.

A curvature-based partitioning 726 shows various zones separated based on the curvature of the roads along the route. Similar to the partitions of other factors discussed above, separate zones correspond to ranges of curvature along the route. Straight zones 728, and curved zones 730 are characterized by the magnitude of the curve factor.

A stop-based partitioning 732 shows various zones based on the frequency of expected stops along the route. High frequency stop zones 734, and non-stop zones 736 may each correspond to respective ranges of intensity of the forecasted stop frequency. Known locations of stop signs and yield signs directly contribute to a stop factor used to quantify the stop intensity.

Each of the series of partitions defines at least one segment transition. The partitionings are superposed over one another. An overall route force pattern 738 is derived based on the alignment of the various locations of the segment transition of all of the series of partitions. The segment transition location may define the end of a previous segment and the beginning of a subsequent segment. By dividing the route based on the locations of the segment transition, no two adjacent segments of the overall route force pattern are defined by the same combination of force characteristics. In the example of FIG. 7, there are seven different combinations of force characteristics, and eight separate segments provided along the route. The number of levels of each partitioning, as well as the particular variation of relative factors may lead to higher segmentation of the overall route force pattern.

It is contemplated that in certain instances the transition locations may occur spatially close enough that a single transition may accommodate multiple magnitude changes of the individual series of partitionings. In the example of FIG. 7, the transition from the fifth segment 748 to the sixth segment 750 may be located to balance several different segment transitions of the individual features. In contrast, the spatial location separation of the magnitude changes between the second segment 742 and fourth segment 746 is great enough to cause an interleaved third segment 744 having different characteristics from the previous segment and the subsequent segment.

The present disclosure provides representative control strategies and/or logic that may be implemented using one or more processing strategies such as event-driven, interrupt-driven, multi-tasking, multi-threading, and the like. As such, various steps or functions illustrated herein may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but it is provided for ease of illustration and description.

The control logic may be implemented primarily in software executed by a microprocessor-based vehicle, engine, and/or powertrain controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    an electric machine configured to propel the vehicle using battery power; and
    a controller programmed to operate the electric machine along a predetermined route based on a superposition of a plurality of partitionings of upcoming portions of the route, wherein each of the partitionings is based on a different set of upcoming static and dynamic resistive force characteristics associated with the route and defines at least one segment transition, and wherein each of the segment transitions defines an end of a previous segment and a beginning of a subsequent segment such that no two adjacent segments of the superposition are defined by a same set of upcoming static and dynamic resistive force characteristics.

2. The vehicle of claim 1 wherein the static force characteristics include static resistive force factors indicative of road curvature, road gradient, road terrain type, forecasted stop frequency, or route speed limits.

3. The vehicle of claim 2 wherein the controller is further programmed to, while operating the electric machine along the predetermined route, receive updated route information and modify at least one of the static resistive force factors based on the updated route information.

4. The vehicle of claim 1 wherein the dynamic force characteristics include dynamic resistive force factors indicative of vehicle acceleration, sudden stop frequency, weather conditions, or traffic conditions.

5. The vehicle of claim 4 wherein the controller is further programmed to periodically update at least one of the partitionings based on changes in the dynamic resistive force factors.

6. A method of operating a vehicle comprising:
    partitioning a predetermined route based on an upcoming static route characteristic into a first series of segments each defined by a first segment transition;
    receiving an upcoming dynamic route characteristic from an external source;
    partitioning the predetermined route based on a second the upcoming dynamic route characteristic into a second series of segments each defined by a second segment transition;
    superposing the first and second series of segments to define the route such that no two adjacent route segments are defined by a same route characteristic; and
    operating an electric machine along the predetermined route based on resistive forces associated with the superposed segments.

7. The method of claim 6 wherein the static route characteristics include static force factors indicative of road curvature, road gradient, road terrain type, forecasted stop frequency, or route speed limits.

8. The method of claim 6 wherein the dynamic route characteristics include dynamic force factors indicative of vehicle acceleration, sudden stop frequency, weather conditions, or traffic conditions.

9. The method of claim 6 further comprising receiving updated route information from an off-vehicle processor while operating the electric machine, and in response, updating at least one of the superposed series of segments based on the updated route information.

10. The method of claim 6 wherein the static route characteristic comprises a vehicle speed pattern along the predetermined route.

11. The method of claim 6 wherein the static route characteristic comprises a stop frequency pattern along the predetermined route.

12. A vehicle powertrain comprising:
an electric machine powered by a battery; and
a controller programmed to
partition a predetermined route based on a static force characteristic,
receive a dynamic force characteristic from an external source during driving,
partition the predetermined route based on the dynamic force characteristic,
superpose the route partitions to define unique route segments, and
demand power output from the electric machine according to an overall route force pattern defined by the segments.

13. The vehicle powertrain of claim 12 further comprising an engine configured to propel the vehicle, wherein the controller is further programmed to allocate power output between the electric machine and the engine.

14. The vehicle powertrain of claim 12 wherein the static force characteristic includes static force factors indicative of road curvature, road gradient, road terrain type, forecasted stop frequency, or route speed limits.

15. The vehicle powertrain of claim 12 wherein the controller is further programmed to, while operating the electric machine along the predetermined route, receive updated route information from an off-vehicle source, and modify at least one of the segments based on the updated route information.

16. The vehicle powertrain of claim 12 wherein the dynamic force characteristic includes dynamic force factors indicative of vehicle acceleration, sudden stop frequency, weather conditions, or traffic conditions.

* * * * *